United States Patent Office 3,544,465
Patented Dec. 1, 1970

3,544,465
ESTERS OF PHOSPHORODITHIOATES
Milton Braid, Westmont, N.J., assignor to Mobil Oil Corporation, a corporation of New York
No Drawing. Filed June 3, 1968, Ser. No. 733,815
Int. Cl. C10m 1/48, 3/42; C10l 1/26
U.S. Cl. 252—46.6                      9 Claims

ABSTRACT OF THE DISCLOSURE

Novel esters of O,O-diorgano-S-(2-hydroxyalkyl) phosphorodithioates are excellent antioxidants and corrosion inhibitors in industrial fluid compositions. Lubricant compositions containing the O,O-diaryl derivatives are particularly effective in high temperature engine performance.

BACKGROUND OF THE INVENTION

Field of the invention

This invention relates to esters of phosphorodithioates and, in particular, it relates to esters of diorganophosphorodithioate-alkylene oxide reaction products.

Description of the prior art

U.S. Patent Nos. 3,197,405 and 3,197,496 describe reactions between triesters of phosphorothioic acids and inorganic phosphorus compounds. The products of these reactions are not entirely satisfactory as additives in industrial fluids.

SUMMARY OF THE INVENTION

Novel esters of organic phosphorodithioates are prepared by reacting a diorganophosphorodithioic acid with an olefin oxide and reacting the intermediate product of this reaction with a compound of boron, carbon, nitrogen, silicon, organophosphorus or sulfur, said compound being capable of forming a stable oxygen-ester bond with the said intermediate. The compound contains at least one reactive chemical group or atom, such as an acyl, acyloxy or hydroxyl group or a halogen atom.

DESCRIPTION OF SPECIFIC EMBODIMENTS

The products of this invention have the following structure:

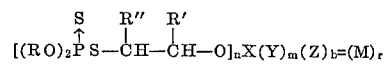

wherein R, R' and R" may each be a hydrocarbyl radical, including alkyl, aralkyl, aryl or alkaryl, and substituted derivatives thereof, containing from 1 to about 30 carbon atoms, and R' and R" may also be hydrogen or members of a cyclic hydrocarbon ring or heterocyclic ring containing atoms of oxygen, nitrogen or sulfur therein, or of a polymeric chain having over 30 carbon atoms; X may be boron, carbon, nitrogen, silicon, phosphorus or sulfur; Y, Z, and M may each be oxygen, sulfur, acyl, alkyl, aralkyl, aryl or alkaryl, alkoxy, aralkoxy, aryloxy and alkaryloxy, and when each contains an organic radical, said radical may contain from 1 to about 30 carbon atoms; n is an integer of from 1 to 3; and the total of m, b, and r may range from 0 to (v-n), v being the valence of X. Preferably, at least one of m, b, or r is at least 1. When X is phosphorus, one or more of Y, Z, or M is an organic group.

The products of this invention are esters which are strikingly effective as anti-corrosion agents and antioxidants in industrial fluids, especially in lubricating oils. These esters are partcularly effective in preventing corrosion of copper surfaces.

The intermediate product in this invention is prepared by a reaction between a diorganophosphorodithioic acid and an organo-1,2-oxide. The acid is produced by known means, usually by the reaction between an alcohol or a phenol or naphthol with phosphorus pentasulfide. This acid,

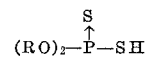

wherein R is defined above, is reacted with an organo-1,2-oxide in which the epoxide grouping is an internal or terminal group. One carbon atom becomes linked to a sulfur atom of the acid, and the hydroxyl group is in the 2-position relative to the sulfur atom as in the structure

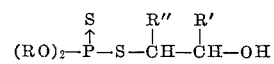

R' and R" being defined previously. This intermediate, which is also referred to as an O,O-diorgano-S-(2-hydroxyalkyl) phosphorodithioate, is then reacted with the reactive acyl, hydroxyl or halogen compound in a condensation reaction to produce the final product.

The alcohols found suitable for reaction with the P$_2$S$_5$ for producing the phosphorodithioic acid contain preferably from 1 to 20 carbon atoms and may include the alcohols, ethyl alcohol, propyl alcohol, n-butyl alcohol, isobutyl and sec.-butyl alcohols, the isomeric primary and secondary amyl alcohols, and mixtures thereof, the primary and secondary isomers of hexyl alcohol, cyclohexyl alcohol, the isomers of octyl alcohol, decyl alcohol, lauryl alcohol, benzyl alcohol, mixtures of these, and the like. Aromatic hydroxy compounds include phenol, cresol, xylenol, naphthol, ethylphenol, butylphenol, nonylphenol, mixtures of these and the like. Mixtures of alcohols and aromatic hydroxy compounds are also suitable. Halogenated derivatives, may also be employed.

The phosphorodithioic acids prepared from these alcohols and phenols are reacted with an organic oxide, which has the structure

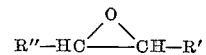

wherein R' and R" have the aforenoted definitions. Suitable oxides include ethyleneoxide, propylene oxide, butylene oxide, cyclohexene oxide, styrene oxide and the like.

In another aspect of this invention, R' or R" or both may also contain additional epoxy groups, as in the cases of the diepoxides and polyolefin polyoxides. The resulting intermediate reaction product could contain two or more hydroxy groups and diorganophosphorodithio groups attached through the sulfur atom to the β-carbon atom relative to the hydroxide, as in the abbreviated structure shown:

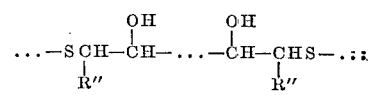

or

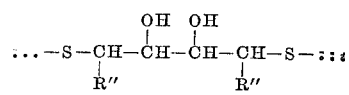

The final products could then have the structure:

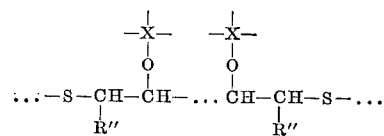

or

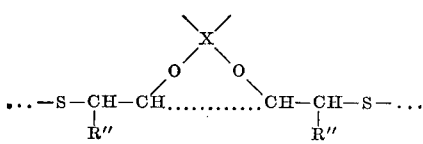

All such structures are included within the scope of this invention.

This reaction to produce the intermediate product is preferably performed in the presence of an inert organic solvent, such as benzene. The reaction mixture may be maintained at a preferred temperature range from about 0° to about 100° C. The reaction mixture may be thereafter refluxed to insure completion of the reaction. The solvent and any unreacted components are removed by distillation under reduced pressure. The reaction product may be refined further by filtering out any undesirable solids or distilling any unwanted side products.

The resulting intermediate is reacted with the active acyl, hydroxyl, or halogen compound, wherein the nonmetallic atom, X, is attached to from 1 to 3 hydroxyl or acyl groups or halogen atoms. Ester formation may take place by condensation with elimination of water, hydrogen halide or acid. As identified above, X may be boron, carbon, nitrogen, silicon, phosphorus, or sulfur.

When X is boron, suitable reactants include halides, boric, boronic or borinic acids, and partial esters thereof produced by reacting the acid or halide with an alcohol or a phenol. Hence Y or Z may be an alkyl, aryl, alkoxy or aryloxy radical, or they may be members of a ring structure, as in the case of a catechol borate derivative. These organic boron compounds may be preformed prior to adding it to the intermediate, as indicated. Alternatively, boron acid or halide and the alcohol or phenol may be separately added to the phosphorodithioic acid-olefin oxide product and the formation occurs in the reaction mixture in situ.

When X is carbon, such reactants include acyl halides, such as acetyl chloride, propionyl chloride, and the like, acid anhydrides, such as acetic, propionic, butyric anhydride and the like, and acids such as acetic, propionic and the like.

When X is silicon, the preferred reactants include, mono-organotrihalosilane, diorganodihalosilane, and triorganohalosilane. The groups attached to the silicon atom may also be organo-oxy radicals. Thus Y, Z, and M may include alkyl, aryl, alkaryl and aralkyl and halogen derivatives thereof, as preferred groups.

When X is phosphorus, at least one of Y, Z or M is organic or organo-oxy. Suitable reactants include phosphorus and thiophosphorus acid derivatives, such as mono- or di-organophosphates and phosphonates and their thiophosphorus analogs, pyrophosphates or anhydrides, halophosphites, halophosphates, phosphonyl halides, and their thiophosphorus analogs, and the like. As with the boron compounds, the reactant may be formed in situ by adding a phosphorus or thiophosphorus halide or anhydride to the reaction mixture containing an alcohol or phenol.

When X is sulfur, the reactant is a thionyl or sulfuryl halide, organo sulfonyl halide, organosulfonic acid, sulfate ester, bisulfate ester and the like.

Thus, Y, Z or M may be an organic or inorganic group or mixtures of the two, or members of one cyclic group, such as a cycloalkyl group or alkylenedioxy or arylenedioxy group. If one substituent attached to X is divalent, a multiple bond linkage may occur as in a carbonyl, sulfoxide or sulfone functional group. The organic radicals may contain from 1 to 30 carbon atoms, and preferably 1 to 20.

The products of this invention may be used in industrial fluids, such as lubricating oils and fuels. Suitable lubricating oils include napthenic and paraffinic mineral oils; synthetic lubricating oils, such as esters of beta-hindered alcohols having 2 to 4 hydroxy groups, such as neopentyl glycol, trimethylolpropane and pentaerythritol, and monocarboxylic acids having from 1 to 25 carbon atoms; hydrocarbon fluids produced from alkanes and olefins, such as polymers of 5 to 15 carbon atoms, i.e. trimer and tetramer of decene; polyglycol ethers; polysiloxane fluids; and the like. These fluids may be further compounded by thickeners to produce grease compositions. Liquid and solid fuels capable of being compounded, such as hydrocarbon fuels, kerosene and gasoline, may also be employed. Plastics and resins, normally susceptible to oxidative attack may be the base media for these additives. All of such compositions are given excellent inhibition and antioxidant stability by the additives of this invention.

The following examples are presented as illustrations of the invention and are not deemed a limitation thereof.

EXAMPLE 1

To a solution of 100 grams (0.32 mole) of O,O-ditolylphosphorodithioate in 100 ml. of benzene, 25.2 grams (0.35 mole) of 1,2-butylene oxide is added over a 30-minute period while stirring and maintaining the reaction temperature at about 40° C. The resulting reaction mixture is then heated at 60° to 80° C. for 30 minutes, filtered and distilled at reduced pressure to remove solvent and unreacted butylene oxide. There remains 119.4 grams (97% yield) of the reaction product, O,O-ditolyl-S-(2-hydroxybutyl)phosphorodithioate.

*Analysis.*—Calc'd (percent): P, 8.09. Found (percent): P, 8.14.

EXAMPLE 2

To the product of Example 1 in 100 ml. of benzene there is added 38 grams (0.49 mole) of acetyl chloride while stirring and maintaining the temperature at 50° C. The reaction mixture is then refluxed at 80° to 84° C. for one additional hour. Solvent and unreacted acetyl chloride is removed by reduced pressure distillation. There remains 139 grams (94% yield) of the esterified product O,O-ditolyl-S-(2-acetoxybutyl) phosphorodithioate.

*Analysis.*—Calc'd (percent): P, 7.29. Found (percent): P, 7.22.

EXAMPLE 3

A mixture of 7.3 grams (0.118 mole) of boric acid and 130 grams (0.353) of O,O-ditolyl-S-(2-hydroxypropyl)-phosphorodithioate is refluxed in 250 ml. of benzene, while the water is distilled off azeotropically and collected in a Dean-Stark tube. When no more water is produced, the reaction mixture is filtered and the solvent is distilled from the filtrate under reduced pressure. The product remaining is the borate ester of the reactant phosphorodithioate, a viscous yellow liquid.

*Analysis.*—Calc'd (percent): P, 8.36; B, 0.97. Found (percent): P, 8.23; B, 0.91.

EXAMPLE 4

A mixture of 74 grams (0.194 mole) of O,O-di-tolyl-S-(2-hydroxybutyl)phosphorodithioate, 6.2 grams (0.1 mole) of boric acid and 11 grams (0.1 mole) of catechol in 200 ml. of benzene is refluxed as in Example 3. After work-up and removal of solvent there remains 88.4 grams of the catechol borate ester of the phosphorodithioate, a clear slightly viscous yellow liquid.

*Analysis.*—P, 6.01; S, 13.2; B, 0.33.

EXAMPLE 5

As in Example 3, a mixture of 127 grams (0.333 mole) of O,O - ditolyl-S-(2 - hydroxybutyl)phosphorodithioate, 10.3 grams (0.166 mole) of boric acid, and 21.6 grams (0.166 mole) of isooctyl alcohol is refluxed in about 130 ml. of benzene. After work-up and removal of solvent there remains the isooctyl borate ester of the phosphorodithioate, a yellow moderately viscous liquid.

*Analysis.*—P, 6.52; B, 0.78.

EXAMPLE 6

A mixture of 123 grams (0.322 mole) of O,O-ditolyl-S - (2 - hydroxybutyl)phosphorodithioate, 86.6 grams (0.666 mole) of isooctyl alcohol, and 20.6 grams (0.333 mole) of boric acid in about 130 ml. of benzene was refluxed as in Example 3. After work-up and solvent removal there remains 228 grams of the diisooctyl borate ester of the phosphorodithioate, a clear light yellow, slightly viscous liquid.

*Analysis.*—P, 4.39; B, 1.30.

EXAMPLE 7

To a solution of 80 grams (0.209 mole) of O,O-ditolyl-S-(2-hydroxybutyl)phosphorodithioate, 13.7 grams (0.105 mole) of isooctyl alcohol, and 60 grams (0.6 mole) of triethylamine in 300 ml. of benzene there is added over a period of about 30 minutes, 14.4 grams (0.105 mole) of phosphorus trichloride while stirring and maintaining the temperature at 25° to 40° C. After addition is completed the reaction mixture is heated for about 1.5 hours at 45° to 52° C. and then hydrolyzed. The organic layer is separated, dried and distilled under reduced pressure to remove solvent. There remains 94 grams of the isooctyl phosphite ester of the phosphorodithioate, a clear, slightly viscous liquid.

*Analysis.*—P, 7.61.

EXAMPLE 8

As in Example 7, 14.4 grams (0.105 mole) of phosphorus trichloride is added over a 15-minute period to a solution of 80 grams (0.209 mole) of O,O-ditolyl-S-(2-hydroxybutyl)phosphorodithioate, 23.1 grams (0.105 mole) of nonylphenol, and 100 grams (1 mole) of triethylamine in 100 ml. of N,N-dimethylformamide. The reaction mixture is heated for one hour at 50° to 52° C. and then washed with water. The organic layer is dried and distilled. There remains 71.1 grams of the nonylphenylphosphite ester of the phosphorodithioate.

EXAMPLE 9

As in Example 7, a reaction is carried out with 14.4 grams (0.105 mole) of phosphorus trichloride, 7.8 grams (0.105 mole) of n-butyl alcohol, 100 grams (1 mole) of triethylamine and 80 grams (0.209 mole) of O,O-ditolyl-S-(2-hydroxybutyl)-phosphorodithioate in 300 ml. of benzene. There is obtained from this reaction 73.1 grams of the n-butylphosphite ester of the phosphorodithioate.

EXAMPLE 10

As in Example 7, a reaction is carried out with 80 grams (0.209 mole) of O,O-ditolyl-S-(2-hydroxybutyl) phosphorodithioate, 30.9 grams (0.42 mole) of n-butyl alcohol, 100 g. of triethylamine and 86.0 grams (0.627 mole) of phosphorus trichloride. After the initial addition of the phosphorus trichloride (1 hour at 25° C.) and subsequent reaction period (about 5.5 hours at 50° C.), an additional 100 grams of triethylamine and 93.5 grams (1.26 mole) of n-butyl alcohol were added and the mixture was heated and stirred at 50° C. for 5 hours. The resulting reaction mixture was filtered. The filtrate is washed with water, dried and distilled to remove solvent, tributyl phosphite, and other volatile materials. There remains about 65 grams of the di-n-butylphosphite ester of the phosphorodithioate, a viscous liquid.

*Analysis.*—Calc'd (percent): P, 11.1. Found (percent): P, 10.6.

EXAMPLE 11

As in Example 7, a reaction is carried out with 80 grams (0.20 mole) of O,O-ditolyl-S-(2-hydroxybutyl)phosphorodithioate, 30.9 grams (0.42 mole) of t-butyl alcohol, 150 grams of triethylamine and 29.7 grams (0.209 mole) of phosphorus trichloride in 300 ml. of benzene. There is obtained from this reaction about 91 grams of the di-t-butylphosphite ester of the phosphorodithioate.

*Analysis.*—Calc'd (percent): P, 11.1. Found (percent): P, 10.6.

EXAMPLE 12

Following the procedure of Example 7, a solution of 86 grams (0.627 mole) of phosphorus trichloride in benzene is added slowly to a solution of 80 grams (0.209 mole) of O,O-ditolyl-S-(2 - hydroxy)phosphorodithioate, 54.6 grams (0.418 mole) of isooctyl alcohol and 150 grams (1.5 mole) of triethylamine in 300 ml. of benzene. After heating, work-up, and removal of solvent there remains 117 grams of the diisooctyl phosphite ester of the phosphorodithioate, a clear yellow, slightly viscous liquid.

*Analysis.*—P, 9.20.

EXAMPLE 13

To a solution of 100 grams (0.272 mole) of O,O-ditolyl-S-(2-hydroxypropyl)phosphorodithioate in 100 ml. of benzene there is added over a 30-minute period while stirring at 86° C., a solution of 16.2 grams (0.136 mole) of thionyl chloride in 100 ml. of benzene. After addition is completed, stirring and heating at 83° C. is continued for about 5.5 hours with continuous evolution of hydrogen chloride. Benzene and unreacted thionyl chloride are removed from the reaction mixture by distillation under reduced pressure. The crude sulfite ester of the phosphorodithioate remains as a clear brown viscous liquid.

*Analysis.*—P, 8.80; S, 18.5.

EXAMPLE 14

To a solution of 73.7 grams (0.2 mole) of O,O-ditolyl-S - (2 - hydroxybutyl)phosphorodithioate in 200 ml. of benzene there is added over a 30-minute period while stirring at 30° to 42° C., 12.9 grams (0.1 mole) of dichlorodimethylsilane. After addition is completed, the reaction mixture is stirred and heated at 81° C. for about 4 hours. Solvent is removed from the reaction mixture by distillation under reduced pressure. There remains 78.5 grams of the crude dimethylsilyl ester of the phosphorodithioate, a slightly viscous yellow liquid.

*Analysis.*—P, 8.25; S, 16.7; Si, 2.3.

EXAMPLE 15

To a solution of 100 grams (0.272 mole) of O,O-ditolyl-S - (2 - hydroxybutyl)phosphorodithioate in 100 ml. of benzene there is added over a 15-minute period while stirring at 60° to 78° C., 27 grams (0.130 mole) of O-butyl-thiophosphoryl dichloride. Heating and stirring at 80° to 83° C. is continued for about one additional hour. The reaction mixture is distilled under reduced pressure, less than 1 mm. to a pot temperature of 120° C. The O-butyl-thiophosphate ester of the O,O - ditolyl - S - (2 - hydroxybutyl)phosphorodithioate remains as a clear yellow, moderately viscous liquid.

*Analysis.*—Calc'd (percent): P, 10.7; S, 18.4. Found (percent): P, 10.6; S, 18.8.

EXAMPLE 16

In a suitable reactor, 35 grams of vinyl cyclohexene dioxide ("Unox 206," a product of Union Carbide) and 121 grams of O,O - diisobutylphosphorodithioate were reacted together, which was conducted for about 1½ hours at a temperature of from 40° to 45° C. The liquid product represented a 97% yield.

*Analysis.*—Calc'd (percent): P, 9.91; S, 20.6. Found (percent): P, 9.79; S, 19.9.

This product is reacted with 0.125 mole of catechol borate; the product contains a residual hydroxy group. This product is also reacted with 0.25 mole of the borate. Both products are useful additives for base media.

EVALUATION OF PRODUCTS

The compounds produced in accordance with this invention were blended into a refined mineral oil lubricant and tested in an oxidation test. A sample of the test composition is heated to 325° F. and air at the rate of about 10 liters per hour is passed through for a period of about 40 hours. Present in the test sample are specimens of iron, copper, aluminum, and lead. The loss in the weight of lead sample is measured, as are the increase in kinematic viscosity measured at 210° F. (percent KV change) and the change in the neutralization number (NN change). It should be noted that the metals are typical metals of engine or machine construction, and they also provide some catalysis for oxidation of organic materials. The compositions are also rated for oxidation stability, said numbers being based on the amount of phosphorus present in the sample required to limit the neutralization number increase to a maximum of 2.0. The results are tabulated in Table 1.

TABLE 1

| Additive of Example | Conc., wt. percent | NN change | Percent KV change | Lead loss, mg. | Stability |
|---|---|---|---|---|---|
| None | | 20.75 | 271 | 80 | |
| 2 | 1 | 0.22 | 13 | 1.1 | |
| 3 | 0.25 | 0.92 | 15 | 4 | |
| 4 | 1 | −0.38 | 9 | 0.6 | |
|   | 0.5 | 0.49 | 11 | 1.4 | 25 |
| 5 | 1 | 0 | 7 | 3.7 | |
|   | 0.5 | 0.69 | 11 | 3.1 | 26 |
| 6 | 1.0 | 0.55 | 8 | 0.3 | |
|   | 0.5 | 2.06 | 16 | 9.7 | |
| 7 | 1 | 7.10 | 48 | 0.5 | |
|   | 0.5 | 4.70 | 47 | 12.9 | |
| 8 | 1 | 2.19 | 18 | 4.1 | |
|   | *1 | 6.10 | 44 | 10 | |
| 9 | 1 | 1.55 | 11 | 0 | |
| 10 | *1 | 1.80 | 20 | 0.1 | |
| 11 | 1 | 0.38 | 9 | 7 | |
|   | *1 | 1.6 | 37 | 43 | |
| 12 | 1 | 5.04 | 38 | 6.4 | |
|   | 0.5 | 5.12 | gel | 5.0 | 40 |
| 13 | 1 | 0.33 | 8 | 0 | |
|   | 0.5 | 1.25 | 43 | 1.5 | |
| 14 | 1.0 | −0.19 | 8 | 0.9 | |
|   | *0.5 | 1.17 | 8 | 1.4 | |
| 15 | 1 | 0.03 | 6 | 1.0 | |
|   | 0.5 | 0.29 | 8 | 0.7 | |

*With 3% by weight of a boron-containing non-metallic detergent.

The products of this invention were tested in the Bearing Corrosion Engine Test. In this test, a single cylinder CLR oil test engine (manufactured by Labeco) is operated for a period of 40 hours at a speed of 3150±10 r.p.m. and a temperature which may reach 290° F. The lubricant is a refined mineral oil containing an additive of this invention. At the end of the test, a copper-lead bearing is weighed to determine the loss of weight in mg. The result is evidence of the ability of an additive to protect the said bearing. The following results were obtained:

TABLE 2

|  | Conc., wt. percent | Bearing wt. loss, mg. |
|---|---|---|
| Product of example: | | |
| None | | 3,669 |
| 2 | 1 | 62 |
| 3 | 1 | 41 |
| 4* | 1.5 | 47 |
| 5* | 1.4 | 40 |
| 15* | 0.85 | 123 |

*Contains 3% by weight of the borated non-metallic detergent.

The results of the tests shown in the above tables indicate that the additives of this invention provide excellent antioxidant protection and reduce metal corrosion in engines.

The products of this invention may be used in lubricating oils, fuels and other industrial compositions, both liquid and solid. These compositions may contain other additives which provide additional characteristics of performance. From about 0.05% to about 10% by weight of the products may be present in the finished composition.

Having described the invention by means of specific illustrations and other embodiments, minor variations of which are still within the scope of the invention, I claim:

1. An organic composition comprising a major proportion of an organic base medium selected from the group consisting of a lubricating oil and a hydrocarbon fuel and an amount sufficient to provide antioxidant properties thereto of a product having the structure

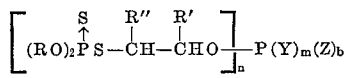

wherein R is selected from the group consisting of alkyl, aralkyl, aryl and alkaryl having from 1 to about 30 carbon atoms, R' and R" are each selected from the group consisting of hydrogen and hydrocarbyl, Y is selected from the group consisting of oxygen and sulfur, Z is selected from the group consisting of alkyl, alkaryl, alkoxy, aralkoxy, aryloxy and alkaryloxy having from 1 to about 30 carbon atoms, $n$ is 1 to 2, $m$ is 0 or 1, and $b$ is 1 to 2, the sum of $b+n$ being 3.

2. The composition of claim 1 wherein the alkoxy group is selected from the group consisting of butoxy and octyloxy.

3. The composition of claim 1 wherein Y is sulfur and Z is alkyl.

4. The composition of claim 1 wherein R is selected from the group consisting of aryl and alkaryl.

5. The composition of claim 4 wherein R is tolyl.

6. The composition of claim 1 wherein R is tolyl, R" is hydrogen and R' is ethyl.

7. The composition of claim 6 wherein Z is nonylphenyloxy.

8. The composition of claim 1 wherein the said product is

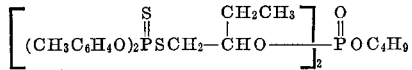

9. The composition of claim 1 wherein the said product is

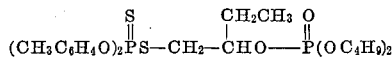

References Cited

UNITED STATES PATENTS 3,197,496    7/1965    Le Suer _____ 252—46.6
3,388,066    6/1968    O'Halloran _____ 252—46.6

PATRICK P. GARVIN, Primary Examiner

J. M. HICKEY, Assistant Examiner

U.S. Cl. X.R.

44—76; 252—46.7, 400

PO-1050
(5/69)

UNITED STATES PATENT OFFICE
CERTIFICATE OF CORRECTION

Patent No. 3,544,465          Dated December 1, 1970

Inventor(s) MILTON BRAID

It is certified that error appears in the above-identified patent and that said Letters Patent are hereby corrected as shown below:

In column 1, line 48, "$(Z)_b=(M)_r$" should be -- $(Z)_b(M)_r$ --. In column 1, line 69, "partcularly" should be -- particularly --. In column 6, line 10, "O,O-ditolyl-S-(2-hydroxy)phosphorodithioate" should be -- O,O-ditolyl-S-(2-hydroxybutyl)phosphorodithioate --.

SIGNED AND
SEALED
MAR 2 1971

(SEAL)
Attest:

Edward M. Fletcher, Jr.
Attesting Officer

WILLIAM E. SCHUYLER, J
Commissioner of Patent